Figure 1:
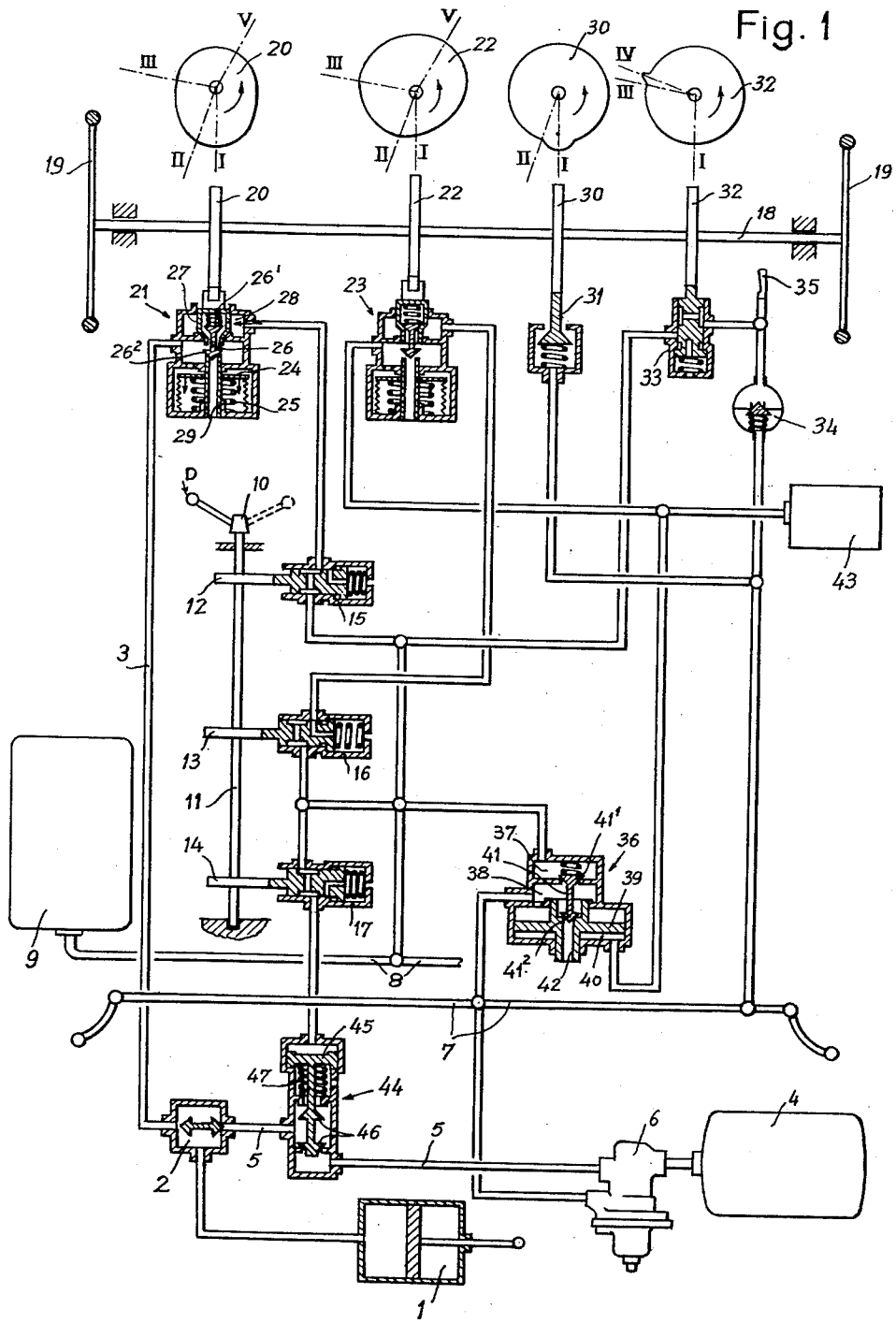

July 3, 1962

L. PÉRAS 3,042,455

SINGLE CONTROL OF DIRECT OR AUTOMATIC BRAKING
SYSTEMS OF THE COMPRESSED AIR
TYPE, NOTABLY FOR RAILWAYS

Filed Nov. 16, 1959

3 Sheets-Sheet 3

United States Patent Office 3,042,455
Patented July 3, 1962

3,042,455
SINGLE CONTROL OF DIRECT OR AUTOMATIC BRAKING SYSTEMS OF THE COMPRESSED AIR TYPE, NOTABLY FOR RAILWAYS
Lucien Péras, Billancourt, France, assignor to Regie Nationale des Usines Renault, Billancourt, France
Filed Nov. 16, 1959, Ser. No. 853,369
Claims priority, application France Dec. 8, 1958
5 Claims. (Cl. 303—26)

This invention relates to compressed-air braking systems, notably for railway vehicles, of the type comprising a main reservoir for the compressed air, a continuous pipe through the train (the "train line") which is supplied at will with air under pressure from said main reservoir, and on each vehicle an auxiliary reservoir adapted to supply operating air to at least one brake cylinder through the medium of a relay valve connected to the main or train line.

In the art of train braking various types of brake valves (the one under the direct control of the engine-driver) for controlling the pressure in the train line have heretofore been proposed, as well as different "direct brake" valves for supplying compressed air to the brake cylinders, notably for those cases where the traction engine is operated separately.

It is the essential object of the present invention to provide a single control device adapted to control the brake application either in the traction engine separately according to the "direct brake" technique, or through the complete train according to the "automatic brake" technique.

This single control device is so arranged that according to the two aforesaid braking methods and after the selection thereof, it requires the same manual actuation in either case, which is obviously extremely advantageous. Thus, the control in accordance with the present invention permits obtaining the two types of braking actions by an identical operation of an operating wheel so that the operator does not have to worry about the type of braking action he has chosen.

This device also offers the possibility of using the aforesaid manual operating member (operating wheel) in a course following the unlocking course of the brakes, in order to actuate the acceleration control of the traction engine and possibly other servomeans.

The control arrangement is for air pressure actuated braking systems of a railway traction engine comprising a brake cylinder, an automatic brake system and a direct brake system adapted to actuate said brake cylinder, the control arrangement including two pressure reducing valves to control respectively the braking pressure of the direct brake system and that of the automatic brake system, a selector having two service positions, valve means to control the feed of compressed air to the pressure reducing valves and means to isolate the brake cylinder from the automatic brake system, said valve means and last means being placed under the dependence of said selector to insure, in one of the positions of the latter, the feed of the pressure reducing valve for the control of the automatic brake system and the venting to the atmosphere of the pressure reducing valve for the control of the direct brake system, and to insure in the other position of the selector the feed of the pressure reducing valve for the direct brake system and the venting to the atmosphere of the pressure reducing valve of the automatic brake system as well as the isolation of the brake cylinder with respect to the automatic brake system, and a manual control member for progressively and simultaneously actuating the two pressure reducing valves in order to effect identical variations, in accordance with its position, of the braking pressure in the direct system or automatic brake system placed in service by said selector.

This system also includes a safety device providing an interlocking action between the single control member and the selector, the arrangement being such that this selector cannot be actuated unless the control member is in its maximum braking position. Under these conditions, the type of brake must be selected before starting, when the engine is at rest, the control member being locked in turn against operation unless the selector is in one of the well-defined positions corresponding to the "direct brake" or "automatic brake" operation in which it is locked immediately as the control member is actuated.

Figure 2:
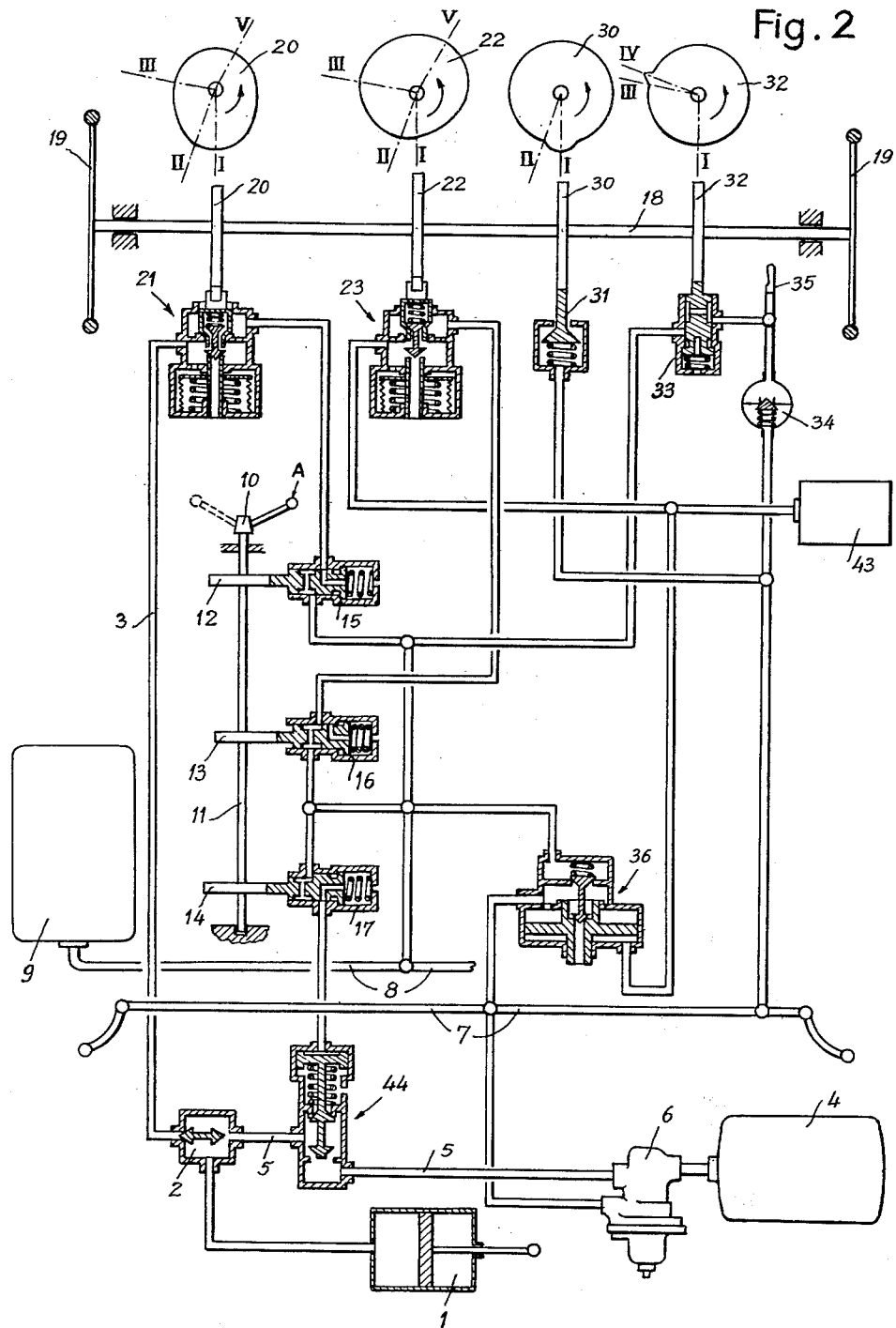
Figure 3:
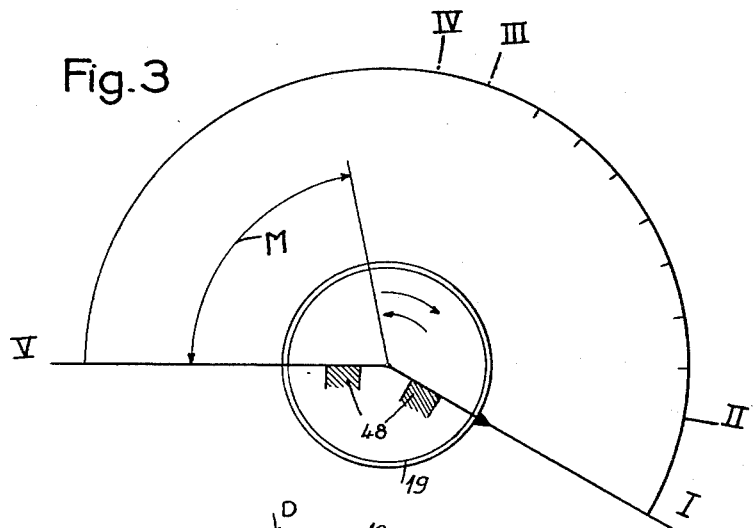
Figure 4:
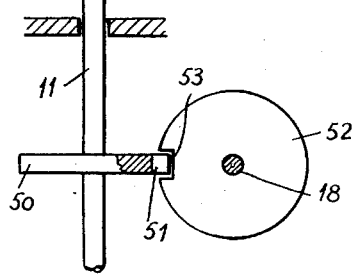
Figure 5:
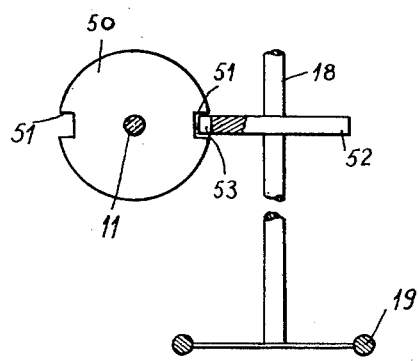

These and other features and advantages of the invention will appear as the following description proceeds with reference to the attached drawings forming part of this specification and illustrating diagrammatically by way of example a typical form of embodiment of the invention. In the drawings:

FIGURE 1 is a diagram illustrating the control means with the selector in the "direct brake" position, FIGURE 2 is a view similar to FIG. 1, but with the selector in the "automatic brake" position, FIGURE 3 is a diagram illustrating the operation of the control means in the different angular positions of the hand control member, FIGURE 4 is a diagrammatic elevational view showing the locking device provided between the control member and the selector, and FIGURE 5 is a plane view from above of the same device.

Associated with or connected to the control means provided in the cab of the traction engine and illustrated in FIGS. 1 and 2 are the conventional components of the braking system of the traction engine which are shown in diagrammatic form; these components include the brake cylinder 1 adapted to be supplied with compressed air in this case through the medium of a double valve 2 either from the main reservoir of the system (not shown) through a "direct brake" line 3, or from an auxiliary reservoir 4 through an "automatic brake" line 5 connected to a relay valve 6 responsive to the pressure in the train line 7. It is known that this train line, when a train is formed, is continuous through the length thereof due to the interconnection of the separate lines of the cars constituting the train, each car being provided with an auxiliary reservoir and a similar distributor with its brake cylinder or cylinders. The function of these components of the braking system, is well known, and it is the essential object of this invention to provide a single control controlling, under direct braking or automatic braking conditions, the pressure available in the line 3 or in the train line 7 from the source of pressure constituted by the main reservoir 9.

This single control device of this invention consists of a two-position selector 10 whereby the desired type of braking can be selected, one position corresponding to the direct braking condition (D, FIG. 1) and the other position to the automatic braking condition (A, FIG. 2). This selector consists broadly of a rotary camshaft 11 carrying a set of cams 12, 13, 14 co-acting with the projecting heads or push members of automatic-return valves 15, 16, 17 respectively with a view to establish the circuits corresponding to the direct braking or automatic braking conditions as will be explained presently.

Furthermore, it comprises a control member the position of which can be varied at will by the engine driver. This control member consists of a camshaft 18 rotatable by means of handwheels 19, 19, disposed on either side of the control board. This camshaft 18 carries inter alia a cam 20 co-acting with a direct-brake pressure reducing valve 21, and a cam 22 co-acting with an automatic-brake pressure reducing valve 23. These cam-controlled pressure reducing valves adapted to be fed with compressed air from the main line 8 are adjustable from a "zero" position to a predetermined pressure value.

In the form of embodiment illustrated and described herein by way of example the pressure obtained through these valves may be for example of the order of 0 to 70 p.s.i., a higher pressure being maintained in the main line, for example about 115 p.s.i. These pressure reducing valves comprise essentially a reaction surface 24 consisting of a long-stroke flexible metal diaphragm urged by a constant-flexibility spring 25, as well as of a double-valve member 26 carried by a socket 27 the linear displacement of which is directly responsive to that of the control member. The socket 27 is positioned in the inlet chamber 28 of the pressure reducing device and constitutes the seat of the inlet valve $26^1$ of the double-valve member; besides, on the low-pressure side, the reaction diaphragm 24 carries a tube 29 open to the atmosphere and acting as a seat to the exhaust valve $26^2$ of the double-valve member. The pressure released by these pressure reducing devices is proportional to the linear displacement of the valve-carrying socket 27 and is obtained by means of a very moderate and nearly constant effort. The specific conditions of operation of these pressure reducing devices will be explained presently.

As shown, the control member is also operatively connected to other elements of the automatic braking system, the comshaft 18 being provided to this end with a cam 30 co-acting with a fast-acting exhaust valve 31 connected to the train line, as well as with a cam 32 co-acting with a push-button operated valve 33 whereby the train line can be subjected to an overload through a non-return valve 34 when necessary. A whistle 35 is disposed between this non-return valve 34 and the valve 33.

Moreover, the automatic-brake pressure-reducing valve 23 co-acts in this case with a relay 36 for controlling the pressure in the train line. This relay comprises an inlet chamber 37 connected to the main line 8, a central or intermediate chamber 38 connected to the train line 7 and provided with a piston 39 forming in the device a control chamber 40 connected to the low-pressure side of the pressure reducing valve 23. This relay is provided with a double valve member 41 comprising an inlet valve $41^1$ and an exhaust valve $41^2$ co-acting with the hollow rod 42 of piston 39 which communicates with the atmosphere. As the ratio of this relay is substantially 1:1, the pressure that can be admitted to the train line from the main line will be equal to the pressure applied to the aforesaid control chamber 40, this state of equilibrium being controlled by the piston 39. A balance reservoir 43 is provided to this end between the pressure reducing valve 23 and this relay to avoid hammering in the control chamber 40 of the relay.

In addition, the automatic brake circuit of the traction engine comprises, between the relay valve 6 and the double valve 2, a cut-off valve 44 opening or closing this circuit according to the position of the selector. This valve comprises a piston 45 carrying a double-valve 46, a spring 47 urging this piston in the direction to keep the line 5 open.

Other possible arrangements will be suggested as the operation of this control system is described hereafter with reference also to FIG. 3 illustrating the different positions of the control handwheel 19 the movement of which is limited by a pair of stops 48.

For the "direct brake" operation the selector is placed in the corresponding position D (FIG. 1) and the description will be made from position I of the control handwheel 19 which is an extreme position corresponding to a maximum brake application as will be seen hereafter.

Assuming that the selector was previously in the "automatic brake" position, when the engine driver moves this selector to the "direct brake" position the following circuits are obtained through the cams 12, 13 and 14:

Cam 12 pushes the slide valve member of valve 15, thus connecting the main line 8 to the inlet side of the pressure reducing valve 21.

Cam 13 clears the slide valve member of valve 16 and the latter, under the influence of its return spring, moves to the left, thus discontinuing the communication between the main line and the automatic-brake pressure reducing valve 23 and venting the inlet chamber of this valve 23 to the atmosphere.

Cam 14 actuates the slide valve member of valve 17, thus connecting the main line with the upper side of piston 45 in the cut-off valve 44. Due to the air pressure, this piston is moved to a position in which it cuts off the communication between the relay valve 6 and the brake cylinder.

In this position, the valve 44 will also vent to the atmosphere that portion of line 5 which connects this valve to the double valve 2.

Moreover, in position I of the control handwheel, the pressure reducing valve 21 has its valve-carrying socket kept in the lower position so that it delivers air at about 70 p.s.i. to the double valve 2. Thus, this air actuates the slide valve member of this double valve 2 and flows into the brake cylinder 1. Under these conditions, a maximum brake application is obtained when the handwheel 19 is in this position I.

As already explained, the supply of compressed air to the pressure reducing valve 23 is cut off, but in addition, when the control wheel 19 is in position I, the cam 22 moves the socket carrying the valve members of this valve to its uppermost position, thus connecting the valve to the exhaust. At the same time, the pressure-balancing reservoir 43 and the control chamber of relay 36 are vented to the atmosphere. The general or train line 7 is thus connected to the atmosphere through the relay 36 and also through the quick-acting exhaust valve 31; however, the latter is open by the cam 30 only when the handwheel 19 is in position I. It will also be seen that the overload supply of compressed air to the main line through valve 33 is discontinued as this valve 33 is not opened by the cam 32 corresponding to position IV of control wheel 19. If the handwheel 19 is actuated from position I to any position between positions II and III, the socket carrying the double valve member of the pressure reducing valve will be lifted as a function of the movement of cam 20, thus venting the brake cylinder 1 to the atmosphere until the inner diaphragm of the valve is lifted and thus caused to close the exhaust without opening the inlet. Under these conditions, a state of equilibrium is obtained wherein the novel pressure available in the brake cylinder is from 0 to 70 p.s.i. Therefore, the actuation of the handwheel 19 between positions II and III corresponds to gradual or progressive brake applications, the complete release of the brake being obtained in position III.

If the control wheel is further rotated to position IV and then to position V, the cam 20 will no more actuate the movable assembly of valve 21 and consequently, as in position III, the brake will remain in its released condition.

It will be noted that in position IV of control wheel 19 the cam 32 acting upon the slide valve member of the overload valve 33 causes the main reservoir to communicate with the general or train line through the valve 34. Thus, the engine driver is warned by the operation of the whistle 35 that the control wheel should not be left in this position. Besides, the pressure in the train line cannot increase since it is still vented through the relay 36.

The angular movement of the handwheel 19 between positions IV and V, or more exactly a shorter movement corresponding to the angle M, may be used for controlling the acceleration of the traction engine. In this case, the control can be effected by a cam keyed onto the shaft 18 and cooperating with the power adjustment device of the motor or motors of the traction engine.

When the control handwheel 19 is moved back from position V to position I, the same operations as described hereinabove but in the reverse order are obtained, so that the traction engine is firstly braked and finally stopped completely.

The automatic brake operation will now also be explained from position I of control wheel 19, after the selector has been moved from position D to position A as required (see FIG. 2), this selector establishing in this case the following circuits:

Cam 12 clears the slide valve member of valve 15 and the latter, urged by its return spring, moves leftwards, thus discontinuing the communication between the main line and the inlet chamber of the direct-brake pressure-reducing valve 21 while venting this chamber to the atmosphere.

Similarly, cam 14 clears the slide valve member of valve 17 and the latter will cut off the communication between the main line and the cut-off valve 44 while venting to the atmosphere the chamber overlying the piston in this valve.

Under these conditions, the valve 44 will re-open the line 5 and if there is some air left in the auxiliary reservoir 4 it will flow through the relay valve 6 in the braking position, as the general line is at 0-p.s.i. pressure. This air will move the slide valve member of the double valve 2 and enters the brake cylinder 1 which has just been vented to the atmosphere by the valve 15 by flowing through the valve 21 in its inlet position when the control wheel 19 is in position I.

On the other hand, cam 13 will actuate the movable slide member of valve 16, thus connecting the main line to the automatic-brake pressure reducing valve 23. As already explained, when the control wheel 19 is in position I, the slide valve member of this valve 23 is in its uppermost position, whereby this valve will not deliver any pressure and the balance reservoir 43 as well as the control chamber of relay 36 will actually be vented to the atmosphere through the exhaust side of this pressure reducing valve.

As the control chamber of relay 36 communicates with the atmosphere, the same applies to the main line 8, the latter being also vented through the quick-action exhaust valve 31 opened by the cam 30.

In this connection, it may be reminded that the overload valve 33 is opened by the cam 32 with respect to the general or train line only when the control wheel 19 is in position IV.

Consequently, position I of this wheel corresponds to an emergency brake application, the train line being at 0 p.s.i.

Now if the wheel 19 is moved to position II, cam 30 will close the quick-action exhaust valve 31 operating only in the case of emergency brake applications, and the valve 23 is moved to its charging position by the cam 22.

In this position of the control wheel the action exerted by the cam 22 upon the pressure reducing valve 23 is such that the latter will deliver to the control chamber of relay 36 a pressure of 40 p.s.i. The similarly fed balance reservoir 43 prevents any hammering in the control chamber of the relay.

This position II corresponds to a maximum brake application, that is, to a 30-p.s.i. "drop in pressure" in the train line normally kept at 70 p.s.i. when the brakes of the engine and the cars attached thereto are fully released.

The air thus introduced at valve 36 into the train line is directed to the brake relay valve such as 6 and if the pressure available in the auxiliary reservoirs is not sufficient, these reservoirs will be supplied again with compressed air. If the pressure available in these auxiliary reservoirs is sufficient, it is necessary to wait until the pressure in the train line has increased.

If the control handwheel 19 is moved from position II to position III, the cam 22 will again operate the socket of the pressure reducing valve 23 and the pressure will build up gradually in the control cahmber of relay 36. Air will be transferred from the main reservoir to the train line until the pressure in this line equals that of the control chamber, that is, 70 p.s.i. if the wheel 19 is in position III. Between positions II and III the brakes are released gradually, position III corresponding to the complete release of the brakes.

If the driver moves the handwheel 19 to position IV, the cam 32 will push the slide valve member of valve 33 and the compressed air from the main reservoir (at 115 p.s.i.) is admitted through the valve 34 to the train line. The engine driver is warned by the whistle 35 that the control wheel should not be maintained in this position.

However, this position IV is advantageous in that it permits a quick refilling of the train line with air at 115 p.s.i., this so-called "overload" position affording a fast brake release under automatic braking conditions.

In case the driver allowed the handwheel 19 to dwell too long in this position IV, the excess pressure in the train line would be vented by the relay 36. As a matter of fact, as the pressure in the train line becomes preponderant, the piston of relay 36 will move to connect this line to the atmosphere until a condition of equilibrium with the control chamber of the relay is obtained; in other words, it tends to maintain a pressure of 70 p.s.i.

Subsequently, from position IV to position V of the control wheel 19, the pressure is kept at 70 p.s.i. in the control chamber. Any leakages in the general or train line are compensated by the relay 36 whereby air is introduced into this line as the pressure drops therein.

As in the preceding case, the normal running position lies between position IV and position V.

As already explained, interlocking safety means are also associated with this control device so that the driver is compelled to choose the type of braking (direct or automatic) before starting, that is, when the traction engine is stopped.

By placing one of the camshafts 11 of the selector or 18 of the control wheel in planes at right angles to each other this interlocking device may advantageously consist of two notched discs keyed or wedged directly on these shafts, as shown in FIGS. 4 and 5 of the drawings. Thus, the selector shaft 11 carries a disc 50 formed with a pair of diametrally opposite notches 51 corresponding one to the direct brake position and the other to the automatic brake position. On the other hand, the shaft 18 of control wheel 19 carries a disc 52 formed with a notch 53, the arrangement being such that the discs overlap by an amount inferior to the depth of their notches, the width of these notches being slightly greater than the thickness of the discs, so that the shafts must be operated separately.

Moreover, in this arrangement, the notch 53 of the disc 52 associated with the control wheel 19 is so disposed that the selector disc 50 will be released only when the wheel 19 is in position I, that is, in the maximum braking position. Only then can the selector be moved to an operative position, whether for direct or automatic braking, as either of its notches 51 will register with the notch 53 of the other disc.

It will be noted that when the selector is in an intermediate position, the control wheel 19 is locked against rotation as the relevant disc 52 itself is locked by the selector disc 50.

Finally, when the selector is properly set in the selected position, the control wheel can be rotated but thereafter it becomes impossible to actuate the selector control member as the corresponding disc 50 is locked by the other disc 52 rotatably solid with the control wheel 19.

Of course, this form of embodiment of a control device arranged in accordance with the teachings of this invention should not be construed as limiting the latter, for many substitutions, modifications and alterations may be brought thereto without departing from the principles of the invention as set forth in the appended claims. Thus, notably, certain components of the automatic braking system could be replaced by others, if desired; more particularly, a special adjustable automatic brake valve may be provided without departing from the spirit and scope of the invention.

I claim:

1. A control arrangement for air pressure actuated braking systems of a railway traction engine comprising a brake cylinder, an automatic brake system and a direct brake system adapted to actuate said brake cylinder, said control arrangement including two pressure reducing valves to control respectively the braking pressure of the direct brake system and that of the automatic brake system, a selector having two service positions, valve means to control the feed of compressed air to the pressure reducing valves and means to isolate the brake cylinder from the automatic brake system said valve means and last means being placed under the dependence of said selector to insure, in one of the positions of the latter, the feed of the pressure reducing valve for the control of the automatic brake system and the venting to the atmosphere of the pressure reducing valve for the control of the direct brake system, and to insure in the other position of the selector the feed of the pressure reducing valve for the direct brake system and the venting to the atmosphere of the pressure reducing valve of the automatic brake system as well as the isolation of the brake cylinder with respect to the automatic brake system, and a manual control member for progressively and simultaneously actuating the two pressure reducing valves in order to effect identical variations, in accordance with its position, of the braking pressure in the direct brake system or automatic brake system placed in service by said selector.

2. A control arrangement according to claim 1, wherein said selector and control member each consist of a rotary shaft carrying cams co-acting with said valve means and said pressure reducing valves.

3. A control arrangement according to claim 1, wherein the selector is subjected to locking means responsive to the position of the control member and its operation is permitted to take place only when the control member is in the position of maximum braking action.

4. A control arrangement according to claim 3, wherein the control member is subjected to locking means responsive to the position of the selector and its operation is permitted to take place only when the selector is placed in one or the other of its two positions.

5. A control arrangement according to claim 2, wherein a safety interlocking device is provided between said selector shaft and said control shaft, said interlocking device consisting of notched discs each rotatably fast with one of said shafts and overlapping each other in the dimension of their notches, the selector disc having two notches corresponding to the direct brake and automatic brake positions, whereas the disc rotatably solid with the control member has a notch formed therein which is so located as to release the selector disc only in the maximum braking position of said control member, whereafter said control member cannot be operated unless the selector is properly positioned in one of its two positions.

References Cited in the file of this patent

UNITED STATES PATENTS

| | | |
|---|---|---|
| 2,112,421 | Masterman | Mar. 29, 1938 |
| 2,627,441 | Gorman | Feb. 3, 1953 |
| 2,725,260 | Hines | Nov. 29, 1955 |
| 2,861,843 | Bentz et al. | Nov. 25, 1958 |